UNITED STATES PATENT OFFICE

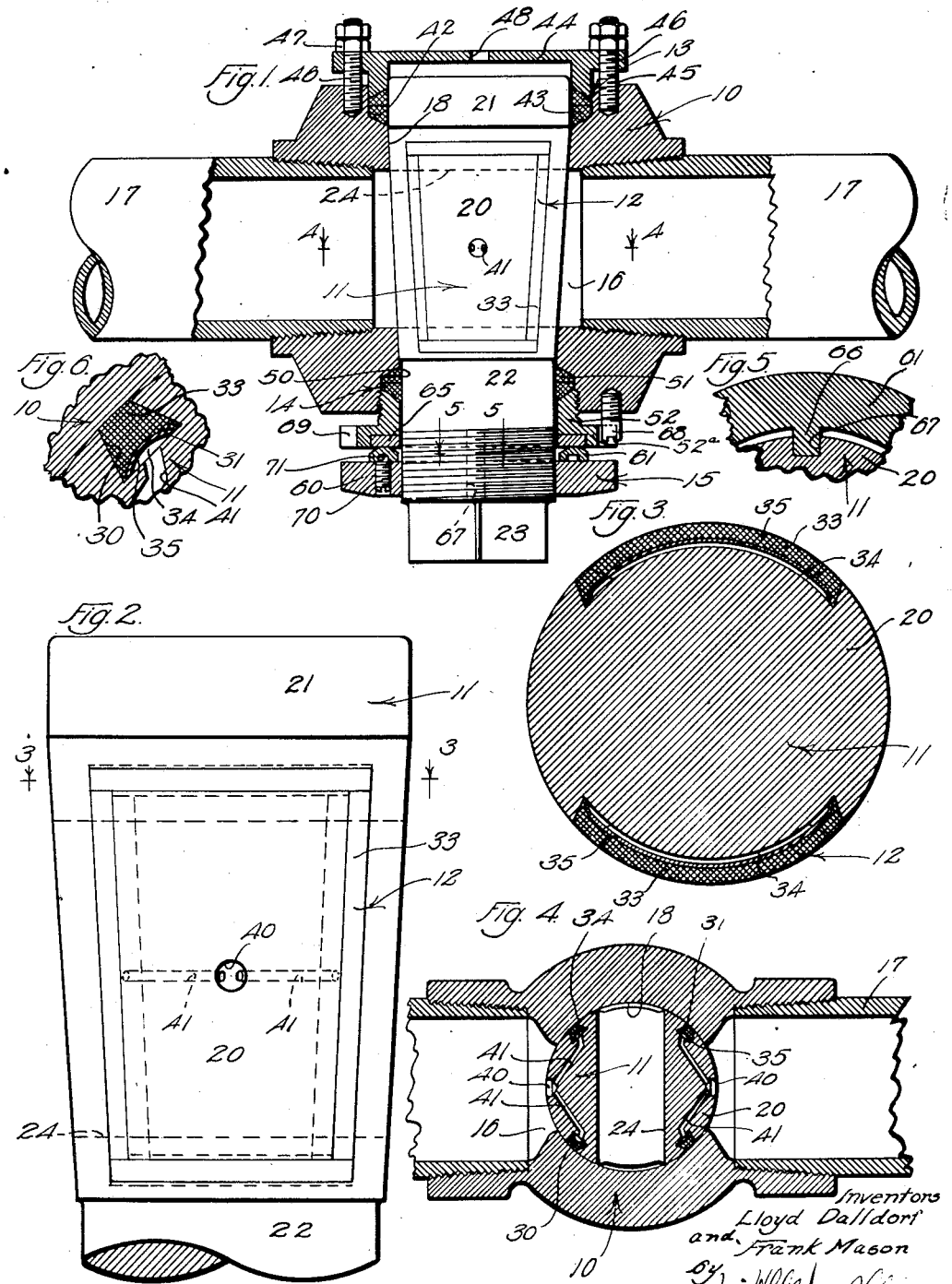

LLOYD DALLDORF AND FRANK MASON, OF SOUTHGATE, CALIFORNIA, ASSIGNORS, BY DIRECT AND MESNE ASSIGNMENTS, TO WILLIAM H. MAXWELL, OF LOS ANGELES, CALIFORNIA

STOPCOCK

Application filed March 8, 1930. Serial No. 434,235.

This invention has to do with a valve or fluid controlling device, and relates particularly to the type of valve known as a stop cock. It is a general object of the present invention to provide a simple, practical stop cock capable of effectively and dependably handling fluids at high pressures.

An object of the present invention is to provide a stop cock in which the pressure held by the device is utilized to effect sealing to prevent leakage.

Another object of the invention is to provide a simple, practical, and effective construction for a device of the character mentioned whereby packing provided between the plug and body is operated by the pressure held by the plug to prevent leakage around the plug.

Another object of the invention is to provide an improved manner of mounting packing in a stop cock to prevent leakage between the body and the plug.

A further object of the present invention is to provide a stop cock which is effective in handling high pressures and yet simple and easy to operate.

It is a further object of the invention to provide an improved construction for holding the plug of a stop cock in place in a body.

Other objects and features of the invention will be best and more fully understood from the following detailed description of a typical form and application of the invention, throughout which description reference is had to the accompanying drawing, in which:

Fig. 1 is a longitudinal detailed view taken through a stop cock provided by this invention, the device being shown connected in a pipe line and with the plug positioned so that the device is open. Fig. 2 is an enlarged detailed view showing the plug portion of the device removed from the body. Fig. 3 is a detailed transverse sectional view taken as indicated by line 3—3 on Fig. 2. Fig. 4 is a detailed transverse sectional view taken as indicated by line 4—4 on Fig. 1 showing the plug in closed position. Fig. 5 is an enlarged detailed plan section taken as indicated by line 5—5 on Fig. 1 and Fig. 6 is an enlarged transverse detail sectional view of the packing provided by the present invention.

The device embodying this invention may include, generally, a body 10, a plug 11 mounted in the body, packing means 12 between the plug and body, packing means 13 and 14 around the end portions of the plug, and means 15 for holding the plug in place in the body. The body 10 may be similar, generally, to the body of the usual type of stop cock, that is, it is provided with intersecting openings, one to pass fluid, and the other to carry the plug which is provided to control the flow of fluid. The fluid opening or passage 16 of the body opens at opposite sides of the body, and in the case illustrated it has its end portions threaded to receive fittings or passages 17 as we have shown in the drawing. The opening 18 provided through the body to carry the plug 11 is at right angles to the fluid passage 16 and intersects the fluid passage so that the plug 11 when in place can be positioned to close the passage 16. The plug opening 18 extends completely through the body and is preferably tapered so that the plug, which is correspondingly tapered, may be effectively seated in it.

The plug 11 is round in cross section and has a tapered main portion 20 which fits the tapered opening 18 in the body, a straight portion 21 at the large end of the main portion 20, a straight portion 22 at the small end of the main portion 20, and a polygonal portion 23 at one end to receive a tool such as a wrench, or the like. An opening 24 extends diametrically through the main portion 20 of the plug at a point to cooperate with the fluid passage 16 of the body. The opening 24 is proportioned and located so that it can be moved into and out of register with the fluid passage 16 by rotation of the plug in the manner common to stop cocks. The portions of the outer surface or wall of the main portion 20 between the two ends of the opening 24 are of greater width or circumferential extent than the opening 24 so that they completely cover or extend over the opening 16 when the plug is in the closed position where the opening 24 is transverse of the opening 16.

The packing means 12 provided by the present invention between the plug 11 and the body 10 is carried by the main portion 20 of the plug and is adapted to pack around the passage 16 to prevent leakage of fluid from the passage around the plug or longitudinally of the plug. When the device is to be used where pressure is to be applied to it from one direction only, it can be made with one unit of the packing means 12 located to pack around the portion of the opening 16 through which pressure enters the device. It is preferred ordinarily, however, to provide two units of the packing means diametrically opposite each other, as shown in Fig. 4 of the drawing, so that the device is effective in handling pressure from either direction. Each unit of packing means 12 includes a body of packing carried in an opening or channel provided in the wall of the main portion 20 of the plug and means whereby pressure is admitted under the packing when the plug is positioned so that the packing is in operation. The channel for carrying each unit of packing provided may be shaped and proportioned to extend continuously and completely around an end of the opening 16 so that the means 12 prevents leakage both longitudinally and circumferentially of the plug. The channels may be formed in various manners. In the case illustrated segmental cuts are made in the wall of the main portion 20 at points immediately above and below the vertical limits of the opening 16 to form the upper and lower parts of the channels, and spaced longitudinal cuts are made connecting the segmental cuts and forming the side portions of the channels.

The longitudinal cuts are spaced apart so that they are at either side of the opening 16 when the plug is positioned so that the packing means is in operation. In accordance with the present invention the channels for carrying the packing 33 are made tapered in cross section, that is, the walls 30 of the channels diverge inwardly so that the bases or bottoms 31 of the channels are wider than the mouths or outer portions of the channels. This is true throughout the entire lengths of the channels.

The body of packing 33 provided in the channels extends continuously and completely around each channel, that is, across the upper and lower portions of the channels and through the side portions of the channels, as clearly illustrated in Fig. 2 of the drawing. The material used in the formation of the packing may vary with different uses of the device. For purpose of example, we will refer to the packing material as being rubber, rubber compositions or other yielding or resilient material being particularly suited for packing water or mud laden fluid at high pressures. Each body of packing is of such cross section as to fill a channel except adjacent the bottom 31 where it is such as to leave a space 34. The space 34 extends continuously around or under the packing. When forming the packing of a material such as rubber, we find it advantageous to mold or vulcanize the packing in the channels, in which case the space 34 can be formed by arranging suitably-shaped sheets of material, such as sheet metal 35, in the bottoms of the grooves to prevent the material being molded from filling the spaces 34. In accordance with the preferred form of the invention the metal parts 35 are curved outwardly or made convex so that pressure in the spaces 34 acts radially outward against the packing. It is preferred that the metal parts 35 be made slightly wider than the mouths of the channels and that the edges of the parts 35 be spaced from the opposite edges of the bottoms of the channels so that the packing seats directly on the bottoms of the channels at the sides of the metal parts 35. The exterior of the packing is finished concentric with the exterior of the plug. When forming the plug with two packing means and by cutting the upper and lower segmental portions of the channels between the longitudinal portions of each unit only, the portions of the plug between the segmental channels of the two units may be integral or solid with the other parts of the plug, or circumferential grooves may be initially formed, and the portions of the grooves between the two units closed or filled in any suitable manner.

The means provided by the present invention to admit pressure to the packing so that the packing is actuated to seal between the plug and the body, includes one or more ducts or passages for admitting pressure behind the packing or into the space 34 of each unit of packing. In the form of the invention illustrated there is an opening 40 in the wall of the plug at a point where it is surrounded by the packing and where it is in communication with the body opening 16 to receive pressure when the plug is positioned to close the opening 16. Branch passages 41 are formed in the plug to connect the opening 40 with a space 34.

The packing means 13 is provided around the large end of the plug to pack between the plug and the body. In the case illustrated the plug opening of the body is enlarged at 42 opposite the portion 21 of the plug to carry packing 43. A follower 44 fits around the portion 21 of the plug and into the opening 42 to compress the packing. In the form of the invention illustrated studs 45 project from the end of the body through a flange 46 on the follower and nuts 47 are threaded on the studs to clamp the follower against the packing. In the preferred form of the invention the follower is in the nature of a cap fitting over the large end of the plug, the cap being completely closed except for a small opening 48 provided to prevent pressure building up between the end of the plug and the follower.

The packing means 14 at the other end of the plug operates to pack between the portion 22 of the plug and the body 10. The plug opening is enlarged at 50 opposite the portion 22 of the plug to carry packing 51. A follower 52 is threaded in the outer portion of the opening 50 so that it can be operated to compress the packing. The follower 52 is provided with a flange 52$^a$ and is adapted to be set against rotation relative to the body by means of a screw 68 threaded into the body and engaging a notch 69 in the peripheral portion of the flange 52$^a$. The peripheral portion of the flange is provided with a plurality of notches 69.

In practice various means may be provided for holding the plug in place in the body. In the preferred form of the invention the means 15 includes a nut 60 screw threaded on the outer part of the plug portion 22 and a ring 61 arranged between the nut 60 and the follower 52. The ring 61 engages a bearing plate 65 provided in the follower 52 and is provided with a lug 66 which extends into a keyway 67 formed longitudinally in the plug portion 22. The lug 66 cooperates with the keyway to prevent turning of the ring relative to the plug. The nut 60 is screw threaded on the plug portion 22 and engages the ring 61 to force it against the follower 52. We provide means for locking the nut in the desired position. In the form of the invention illustrated a lock screw 70 is carried by the nut to be positioned so that it projects into an opening 71 in the ring 61. The ring 61 is provided with a plurality of openings 71 for receiving the lock screw 70.

When the device is in operation the nut 60 is set so that the plug is held in the plug opening of the body with the portion 20 of of the plug seated in the body. When the plug is positioned so that the passage 24 is in registry with the opening 16 of the body, fluid is free to flow through the device. To close the device or to shut off the flow the plug is rotated into position where the passage 26 is transverse of the opening 16 and the opening is closed by the plug. When the plug is in the closed position, the packing means 12 operates to prevent leakage either circumferentially or longitudinally of the plug. The pressure held by the plug is admitted back of the packing through an opening 40 and passage 41. The packing being of conforming material, is urged outwardly by the pressure so that it makes a tight joint between the plug and the body.

Having described only a typical preferred form of our invention, we do not wish to limit ourselves to the specific details set forth, but wish to reserve to ourselves any changes or variations that may appear to those skilled in the art or fall within the scope of the following claims:

Having described our invention, we claim:

1. A stop cock of the character described including, a body having intersecting openings, one opening being a fluid passage, a plug in the other opening operable to prevent the passage of fluid through the fluid passage, and packing means operable by pressure in the passage to seal between the plug and body around the passage adjacent its point of intersection with the other opening, including packing carried in a channel in the plug, and a duct in the plug for passing fluid pressure from the passage to the channel when the plug is in the closed position.

2. A stop cock of the character described including, a body having intersecting openings, one opening being a fluid passage, a plug in the other opening operable to prevent the passage of fluid through the fluid passage, and packing means operable by pressure in the passage to seal between the plug and body around the passage adjacent its point of intersection with the other opening, including packing carried in a channel in the plug, and means whereby pressure from the passage is admitted under the packing when the plug is in the closed position.

3. A stop cock of the character described including, a body having intersecting openings, one opening being a fluid passage, a plug in the other opening operable to prevent the passage of fluid through the fluid passage, packing means to seal between the body and the opposite ends of the plug, and packing means operable by pressure in the fluid passage to seal around an end of the passage adjacent its point of intersection with the other opening when the plug is in the closed position, including expansible packing carried in a channel in the plug, there being an opening in the plug communicating with the channel and with the fluid passage when the plug is in the closed position.

4. A stop cock of the character described including, a body having intersecting openings, one opening being a fluid passage, a plug in the other opening operable to prevent the passage of fluid through the fluid passage, and packing means operable by pressure in the fluid passage to seal between the plug and body around an end of the passage adjacent its point of intersection with the other opening when the plug is in the closed position, including expansible packing carried in a continuous channel in the plug, there being an opening in the plug communicating with the channel and with the passage when the plug is in the closed position.

5. A stop cock of the character described including, a body having intersecting openings, one opening being a fluid passage, a plug in the other opening operable to prevent the passage of fluid through the fluid passage, and packing means operable by pressure in the fluid passage to seal between the plug and body around an end of the passage adjacent its point of intersection with the said other opening when the plug is in the closed position, including expansible packing carried in a channel in the plug having outwardly convergent side walls, there being an opening in the plug communicating with the channel and with the passage when the plug is in the closed position.

6. A stop cock including, a body having intersecting openings, one opening being a fluid passage, a plug in the other opening operable to prevent the flow of fluid through the passage, and packing means operable by fluid pressure in the passage to seal between the plug and body around the passage adjacent its point of intersection with the other opening when the plug is in the closed position, said means including, expansible packing in a channel in the plug, there being a space in the channel at the base of the packing, the plug having an opening communicating with the space and with the passage when the plug is in the closed position.

7. A stop cock including, a body having intersecting openings, one opening being a fluid passage, a plug in the other opening operable to prevent the flow of fluid through the passage, and packing means operable by pressure in the passage to seal between the plug and body around the passage adjacent its point of intersection with the other opening when the plug is in the closed position, said means including, expansible packing in a channel in the plug, a substantially rigid part in the channel at the base of the packing, there being a space under the said part, and a duct in the body communicating with the space and with the passage when the plug is in the closed position.

8. A stop cock including, a body having intersecting openings, one opening being a fluid passage, a plug in the other opening operable to prevent the flow of fluid through the passage, and packing means operable by pressure in the passage to seal between the plug and body around the passage adjacent its point of intersection with the other opening when the plug is in the closed position, said means including, expansible packing molded in a channel in the plug, and a substantially rigid part in the channel at the base of the packing there being a space under the said part, the plug having a duct communicating with the space and with the passage when the plug is in the closed position.

9. A stop cock including, a body having intersecting openings, one opening being a fluid passage, a plug in the other opening operable to prevent the flow of fluid through the passage, and packing means operable by fluid pressure in the passage to seal between the plug and body around the passage adjacent its point of intersection with the other opening when the plug is in the closed position, said means including, expansible packing in a channel in the plug, and a substantially rigid part in the channel at the base of the packing, there being a space under the said part, the plug having ducts communicating with the space at spaced points and with the passage when the plug is in the closed position.

10. A stop cock including, a body having intersecting openings, one opening being a fluid passage, a plug in the other opening operable to prevent the flow of fluid through the passage, and packing means operable by pressure in the passage to seal between the plug and body around the passage adjacent its point of intersection with the other opening when the plug is in the closed position, said means including, expansible packing in a channel in the plug having outwardly convergent sides, and an outwardly convexed substantially rigid part in the channel at the base of the packing, there being a space under the said part, the plug having a duct communicating with the space and the passage when the plug is in the closed position.

11. A stop cock of the character described including, a body having intersecting openings, one opening being a fluid passage, a plug in the other opening operable to prevent the passage of fluid through the fluid passage, and diametrically opposite sealing units on the plug operable to seal between the plug and body around the ends of the passage, each unit including expansible packing in a continuous channel in the plug, and means whereby pressure from the passage is admitted under the packing when the plug is in the closed position.

In witness that we claim the foregoing we have hereunto subscribed our names.

LLOYD DALLDORF.
FRANK MASON.